United States Patent [19]

Woodcock et al.

[11] Patent Number: 4,887,578
[45] Date of Patent: Dec. 19, 1989

[54] ON BOARD REFUELING VAPOR RECOVERY SYSTEM

[75] Inventors: William F. Woodcock, Dearborn; William E. Ruhig, Jr., Sterling Heights, both of Mich.; Loren H. Kline, Oregon, Ohio

[73] Assignee: Colt Industries, Inc., New York, N.Y.

[21] Appl. No.: 101,069

[22] Filed: Sep. 25, 1987

[51] Int. Cl.⁴ .............................................. F02M 39/00
[52] U.S. Cl. ..................................... 123/519; 123/520; 123/516; 137/588
[58] Field of Search ............... 123/516, 518, 519, 520, 123/521; 137/588, 589

[56] References Cited

U.S. PATENT DOCUMENTS

| | | | |
|---|---|---|---|
| 3,957,025 | 5/1976 | Heath | 123/520 |
| 4,000,727 | 1/1977 | Walker | 123/519 |
| 4,701,198 | 10/1987 | Uranishi | 123/519 |
| 4,706,708 | 11/1987 | Fornuto | 137/589 |
| 4,724,861 | 2/1988 | Covert | 137/588 |
| 4,760,863 | 8/1988 | Broer | 137/588 |
| 4,768,566 | 9/1988 | Ito | 137/588 |

*Primary Examiner*—Carl Stuart Miller
*Attorney, Agent, or Firm*—Walter Potoroka, Sr.

[57] ABSTRACT

An onboard refueling vapor recovery system for a motor vehicle prevents fuel vapor displaced from the vehicle fuel tank during a refueling operation from being discharged into the atmosphere and stores the fuel vapor for subsequent combustion in the vehicle engine. The system operates in parallel with a known vapor recovery system employed to minimize venting of vapor from the fuel tank through the normal fuel tank vent, this known system being inadequate to cope with the massive surge of vapor expelled during refueling which presently is vented to atmosphere through the fuel tank fill pipe. The refueling vapor recovery system includes a refueling vapor storage canister which is directly connected via a substantially unrestricted flow passage to the head space of the tank when, and only when, a standard fuel dispensing nozzle is operatively located in the fill pipe inlet. The nozzle is inserted through a seal which prevents the escape of vapor from the fill pipe. A float valve in the tank closes the passage to the refueling canister when the tank is filled and the consequent pressure increase will normally actuate the conventional nozzle shutoff mechanism. Emergency devices in the system will sound an audible signal if the nozzle shutoff malfunctions and will dump fuel from the filler pipe if manual shutoff of the nozzle does not occur in response to the audible signal. The system includes further internal pressure and flow regulating devices.

27 Claims, 6 Drawing Sheets

ON BOARD REFUELING VAPOR RECOVERY SYSTEM

BACKGROUND OF THE INVENTION

For the past several years, the Environmental Protection Agency has been proposing regulations which would limit the amount of fuel vapor released into the atmosphere during the refueling of a motor vehicle. During refueling, the incoming fuel must displace fuel vapor from the head space in the fuel tank and this displaced vapor is vented through the filler pipe into the atmosphere. Air pollution and safety problems resulting from this situation are obvious.

One approach to this problem, presently in use in California, has been to equip the fuel dispensing pumps at service stations with a vapor recovery system which collects fuel vapor discharged from the fuel tank filler pipe during the refueling operation and transfers the vapor to a storage tank. The primary drawbacks of this system are the substantial expense involved in equipping each individual fuel pump with the necessary components of the system and the present lack of a safe and economically practical method for disposing of the vast quantities of fuel vapor collected by the system.

In recent years, on board (vehicle carried) fuel vapor recovery and storage systems have been developed in which the head space in the vehicle fuel tank is vented to atmosphere through a charcoal filled vapor canister and fuel vapor is withdrawn from the canister into the engine intake manifold for mixture and combustion with the normal fuel charge. Because the fuel tank head space must be vented to enable fuel to be withdrawn from the tank during vehicle operation, this system addresses the problem of the discharge of fuel vapor through the atmospheric vent to the tank when ambient pressure and temperature conditions are such that vapor pressure within the fuel tank exceeds atmospheric pressure.

In the typical system of this type, the canister outlet is connected to the intake manifold of the vehicle engine through a normally closed purge valve. A computer which monitors various vehicle operating conditions controls opening and closing of the purge valve to assure that the fuel mixture established by the carburetor is not overly enriched by the addition of fuel vapor from the canister to the mixture. Thus, with the opening and closing of the purge valve between the canister and intake manifold, the canister is intermittently subjected to intake manifold vacuum. The atmospheric vent of the canister is relatively restricted to enable the development of a pressure differential withdrawing vapor from the canister when it is connected to the intake manifold. The flow and storage capacities of such a system, which will be referred to as a "running vapor recovery system", are totally inadequate to cope with the massive surge of fuel vapor displaced from the fuel tank during a refueling operation.

The present invention is directed to an on board refueling vapor recovery system which may be operated in parallel with the running vapor recovery system described above to prevent the discharge of the relatively large quantities of fuel vapor displaced from the fuel tank during refueling into the atmosphere and to store fuel vapors so recovered for combustion at a controlled rate by the vehicle engine.

SUMMARY OF THE INVENTION

In a system embodying the present invention, the filler pipe of the fuel tank is provided near its inlet end with a nozzle receiving passage defined by an annular seal dimensioned to slidably and sealingly receive a tubular fuel dispensing nozzle of a standard outer diameter. A trap door type seal is mounted at the inner side of the annular seal and is spring biassed to a normally closed position. The inlet to the fuel tank filler pipe is thus sealed at all times in that the trap door seal is not opened until a sliding seal has been established with a fuel dispensing nozzle inserted axially through the annular seal.

A charcoal filled refueling vapor canister, having a capacity substantially greater than that of the canister of the running vapor recovery system, is mounted at a suitable location on the vehicle and a conduit of an internal diameter large enough to permit substantially unrestricted flow of vapor is connected between the head space of the vehicle fuel tank and the refuel vapor canister. Flow of vapor through this conduit is normally prohibited by a normally closed valve in the conduit. In the systems disclosed in this application, the normally closed valve is automatically shifted to an open position in response to the insertion of a fuel dispensing nozzle through the annular seal at the inlet end of the fuel tank filler pipe and remains open until the nozzle is withdrawn at the conclusion of the refueling operation. Fuel vapor displaced from the tank by incoming fuel thus freely flows through the conduit from the fuel tank into the refueling vapor canister.

A float valve is located within the fuel tank to close the inlet to the vapor conduit when the level of fuel in the tank reaches a predetermined "tank full" level. Closure of the float valve blocks further escape of fuel vapor from the tank to the refuel vapor canister, and the resultant increase in pressure in the head space of the tank will normally trigger the automatic shutoff mechanism conventionally employed in the fuel dispensing nozzle.

In the event the automatic nozzle shutoff should malfunction, the system includes an audible signal actuated upon an increase in pressure in the head space of the tank above a selected pressure, and if fuel continues to flow from the nozzle into the tank, a further increase in pressure will open a bypass valve at the inlet end of the filler pipe to let the excess fuel spill from the filler pipe.

The refuel vapor canister is also connected to the outlet of the running vapor canister so that fuel vapor can be withdrawn for combustion in the engine under the control of the purge valve as described above.

Other objects and features of the invention will become apparent by reference to the following specification and to the drawings.

Figure 1:
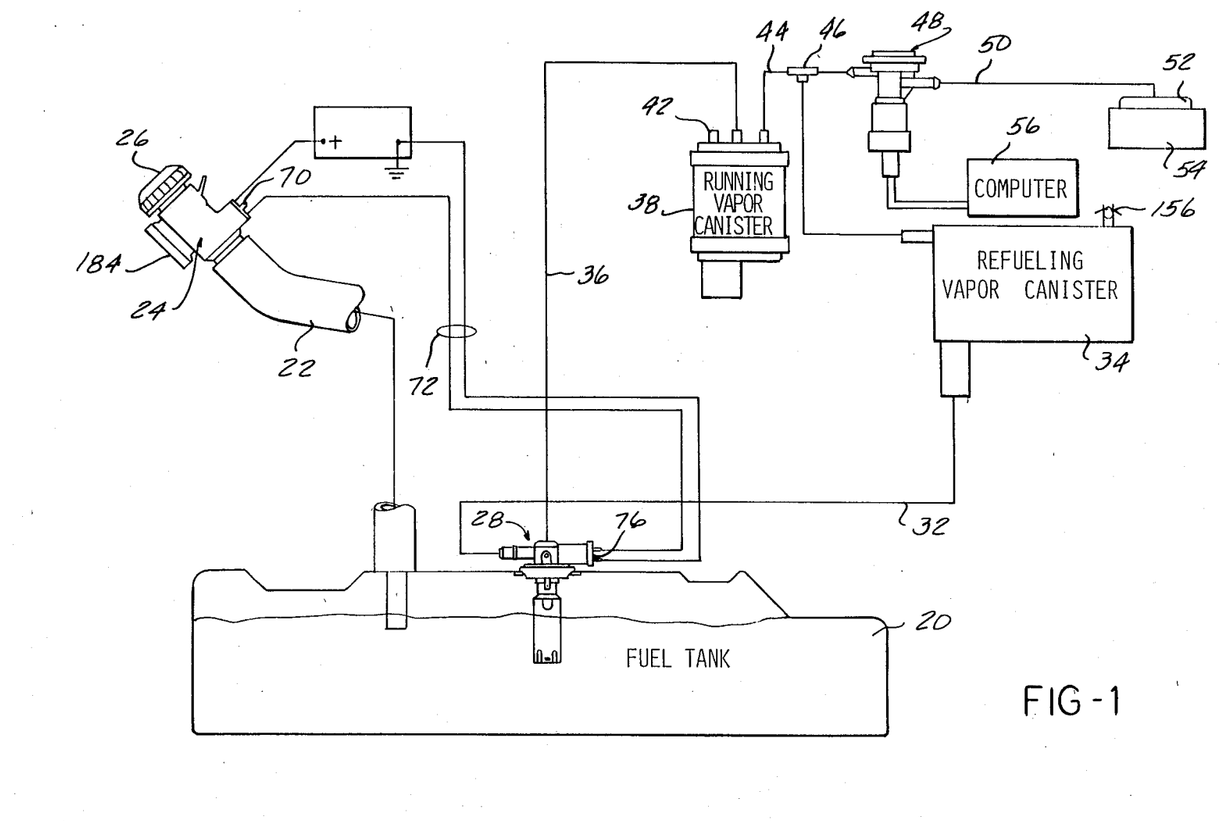
FIG. 1 is a schematic diagram of an on board refueling vapor recovery system embodying the present invention.

In the embodiment of the invention schematically shown in FIG. 1, the fuel tank 20 of a vehicle is provided, in a conventional manner, with a fill pipe 22 connected at its upper end to a fill neck assembly designated generally 24 normally closed by a cap 26. A tank valve designated generally 28 is sealingly mounted in the top wall of fuel tank 20 and is connected externally of the tank via a conduit 32 to a refueling vapor canister 34 and via a second conduit 36 to a running vapor canister 38.

Running vapor canister 38 is vented to atmosphere by a vent 42 which functions as a vent to the head space of fuel tank 20 via the canister 38, conduit 36 and passage means in tank valve 28 to be described in more detail below.

Running vapor canister 38 is provided with an outlet which is connected via conduit 44, T fitting 46, purge valve 48 and conduit 50 to the intake manifold 52 of the internal combustion engine 54 which powers the vehicle.

When engine 54 is running and purge valve 48 is open, the vacuum existing in intake manifold 52 will draw fuel vapor from running vapor canister 38 via conduits 44, 50 into the intake manifold to be mixed with the fuel mixture supplied to the manifold via the carburetor or fuel injection pump, not shown. Opening and closing of purge valve 48 is under the control of a computer 56 which is programmed to open and close purge valve 48 in response to variations in various characteristics and parameters of engine operating conditions to assure that the fuel mixture in manifold 52 will not be overly enriched by the addition of fuel vapor.

Running vapor recovery systems employing a running vapor canister 38 and a computer controlled purge valve 48 as described above have been employed for several years to minimize the escape of fuel vapor to the atmosphere through the fuel tank vent. Vapor pressure in the head space of fuel tank 20 is variable and dependent primarily upon temperature and the volatility of the fuel contained in tank 20. Because consumption of fuel during normal operation of the engine does not require any substantial inflow of pressure equalizing air into the head space of the tank via the vent, the vapor flow passages of the running vapor recovery system are relatively restricted so that discharge of fuel vapor through the vent in response to short term increases of vapor pressure in the tank is minimized. This design requirement makes the running vapor recovery system ineffectual to cope with the rapid and substantial displacement of fuel vapor from the fuel tank head space generated by a tank refueling operation. To recover and prevent fuel vapor displaced from the fuel tank during a refueling operation from being discharged into the atmosphere, the present invention provides a refueling vapor recovery system which acts in parallel conjunction with the present day running vapor recovery system described above.

Figures 2, 3, 4:
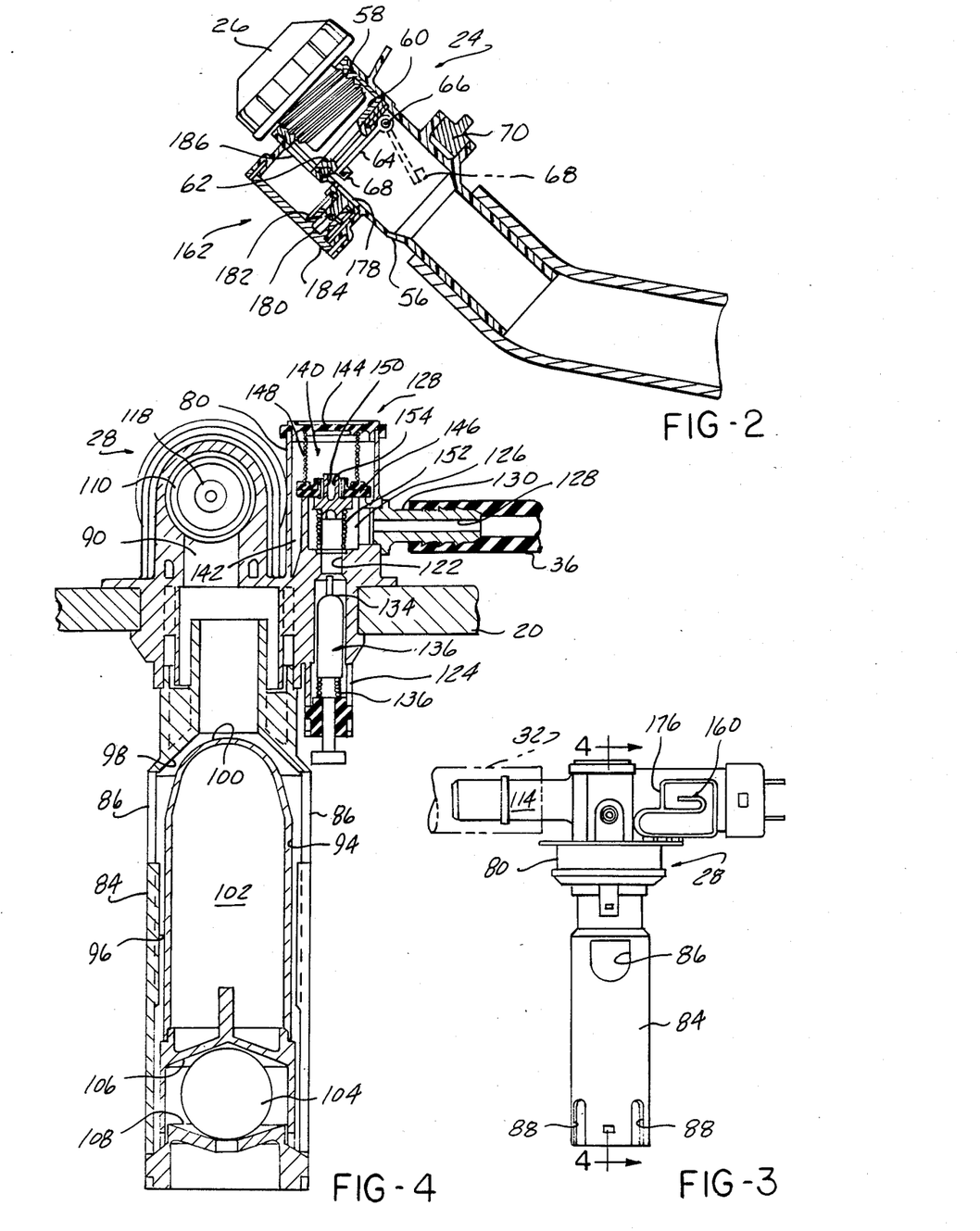
FIG. 2 is a detail cross-sectional view of the inlet end of the filler pipe portion of the system of FIG. 1.
FIG. 3 is a side elevational view of a tank valve employed in the system of FIG. 1.
FIG. 4 is a detail cross-sectional view of the tank valve taken on line 4—4 of FIG. 3.
Figure 5:
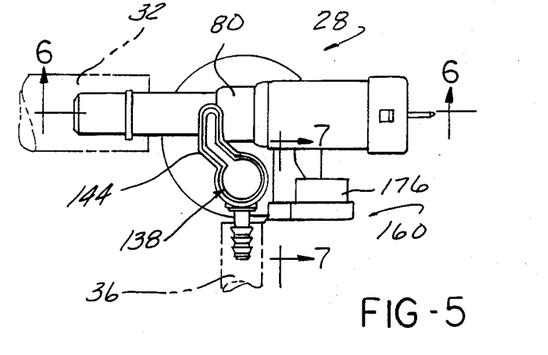
FIG. 5 is a top plan view of the tank valve of FIG. 3.

In addition to the refueling vapor canister 34 and tank valve 28, the system of FIG. 1 includes a fill neck assembly best shown in FIG. 2.

Referring to FIG. 2, fill neck assembly 24 includes a main housing 56 of generally hollow tubular configuration formed from a suitable plastic or non-magnetic material. The lower end of housing 56 is sealingly received in the upper end of fill pipe 22 and a cup shaped insert 58 is snugly received within the upper end of housing 56 to provide an internal thread for receiving the closure cap 26 and to provide a transverse partition or bulk head 60 extending across the interior of the tubular housing 56. A circular opening through partition 60 mounts an annular seal 62 which defines a passage through partition 60. A plate like trap door seal 64 hingedly mounted as at 66 on the under side of partition 60 is spring biassed to the closed position shown in full line in FIG. 2 in which plate 60 engages the under or inner side of annular seal 62 to act as a one-way valve preventing flow of liquid or vapor upwardly from fill pipe 22 through the passage defined by the annular seal 62.

The internal diameter of annular seal 62 is such that the seal will slidably and sealingly receive the tubular fuel dispensing nozzle of a conventional service station fuel pump, such nozzles being constructed to an industry standard outer diameter.

Suitable portions of fill neck assembly 24 which will be contacted by the fuel dispensing nozzle are provided with means, not shown, for electrically grounding the nozzle to the vehicle frame during the refueling operation.

Upon removal of closure cap 26 and the insertion of the fuel dispensing nozzle through seal 62, the trap door plate 64 will be hinged by the nozzle to the broken line position shown in FIG. 2 at which time a magnet 68 carried on trap door plate 64 will be in close enough proximity to a magnetically actuated reed switch 70 to close the contacts of the switch. Although the trap door seal plate 64 is opened by the insertion of the fuel dispensing nozzle, the interior of fill pipe 22 remains sealed from the atmosphere by the engagement of the annular seal 62 with the outer side of the inserted nozzle.

Closure of the contacts of reed switch 70 completes an electric circuit through conductive wires 72, 74 to energize a solenoid 76 in tank valve 28 for a purpose to be described below.

Referring now particularly to FIGS. 3–7, tank valve 28 includes a housing 80 which, as best seen in FIG. 4, is fixedly and sealingly mounted within an opening 82 through the top wall of fuel tank 20. A hollow tubular float valve-rollover valve housing 84 is fixedly secured to the bottom of main housing 80 to project vertically downwardly into the interior of tank 20. Housing 84 is formed with various openings 86, 88 through its side wall and the interior of housing 88 constitutes an inlet from the interior of tank 20 to an inlet passage 90 (FIGS. 4 and 6) of housing 80.

Mounted for vertical sliding movement within housing 84 (FIG. 4) is a combination float-rollover valve member 94 guided for vertical movement within housing 84 as by inwardly projecting ribs 96. Ribs 96 are spaced circumferentially about the interior of housing 84 so that vapor can flow freely upwardly through housing 84 from openings such as 88 located at the bottom of the housing as well as through openings 86. A downwardly facing frusto-conical valve seat 98 is formed in the interior of housing 84 to cooperate with a hemispherical valve head portion 100 on the float-rollover valve member 94.

Valve member 94 is normally gravitationally maintained in the position shown in FIG. 4 spaced clear of valve seat 98, however when the level of fuel in tank 20 rises to a predetermined level the float member 94 is elevated by the rising fuel to seat against valve seat 98 and block fluid communication between the interior of tank 20 and inlet passage 90 of the main valve housing 80. Valve member 94 is provided with a sealed internal buoyancy chamber 102.

To similarly seal inlet passage 90 from the interior of tank 20 in the event of a vehicle rollover, a metal ball 104 is engaged between a frusto-conical recess in the bottom of valve member 94 and a similar oppositely oriented frusto-conical surface 108 fixedly mounted at the bottom of housing 84. In the event housing 84 is tilted more than approximately 20° from the vertical, ball 104 will move out of a centered relationship with the opposed frusto-conical surfaces and cam valve member 94 upwardly into seated engagement with valve seat 98.

Figure 6:
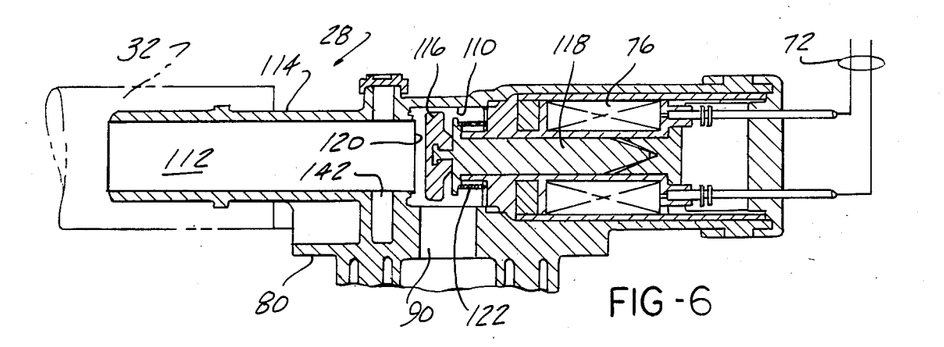
FIG. 6 is a cross-sectional view taken on line 6—6 of FIG. 5.

Referring now particularly to FIG. 6, inlet passage 90 in housing 80 opens at its upper end into an internal chamber 110 in housing 80 which in turn opens at its left side as viewed in FIG. 6 into a main outlet passage 112 which extends outwardly through a projecting hose coupling 114 formed on housing 28. Communication between chamber 110 and outlet passage 112 is controlled by a valve head 116 carried on the armature 118 of solenoid 76, valve head 116 being movable from the open position shown in FIG. 6 to a closed position in seated engagement with a valve seat 120 at the entrance to passage 112. Armature 110 is resiliently biassed to the left as viewed in FIG. 6 by a compression spring 122, and valve head 116 is maintained by spring 122 in seated engagement with its seat 120 at all times when solenoid 76 is not energized. When solenoid 76 is energized by the closure of reed switch 70 as described above, armature 118 is withdrawn to the right to the position shown in FIG. 6 to place the head space in fuel tank 20 in communication with conduit 32 mounted on hose coupling 20 via inlet passage 90, chamber 110 and passage 112. As described above, this communication is established by the insertion of the fuel dispensing nozzle into fill neck assembly 24 through annular seal 62 and the consequent closure of the contacts of reed switch 70 by the displacement of the trap door in the fill neck.

From the foregoing, it is seen that two conditions must be met to establish fluid communication between the head space of fuel tank 20 and refueling vapor canister 34 via tank valve 28 and conduit 32. First, the nozzle of a fuel supply pump must be inserted through annular seal 62 of fill neck 24 to open the solenoid valve 76, 116, 120 to signal the system that a refueling operation is in progress. The second condition which must be met is that the float valve member 94 is disengaged from its seat, telling the system that the tank has not yet been completely refilled. Termination of the refueling operation is made known to the system either by withdrawing the fuel dispensing nozzle from the fill neck, thus de-energizing solenoid 76 and engaging valve head 116 on seat 120 or by the filling of the tank to a level such that float valve member 94 is seated on its valve seat 98. Either of these two latter events blocks communication between the head space of fuel tank 20 and refueling vapor canister 34 via conduit 32.

Fluid communication between the head space of tank 20 and running vapor canister 38 via conduit 36 is established through tank valve 28 via an inlet passage 122 (FIG. 4) which extends through housing 80 from an inlet opening 124 opening into the head space of the tank to a chamber 126 and from chamber 126 through an outlet passage 128 extending through a projecting hose coupling 130 formed on housing 80. In normal circumstances, running vapor canister 38 is in direct communication with the head space of fuel tank 20 at all times via conduit 36, passage 128, chamber 126, inlet passage 122 and inlet opening 124.

A normally open rollover valve designated generally 132 is located near the lower end of inlet passage 122 to block inlet passage 122 in the event of a vehicle rollover condition. Valve 132 includes a rounded valve head 134 which rests upon the top of a relatively light compression spring 136. Spring 136 is so calibrated that it is normally unable to lift valve head 134 vertically, but is strong enough to move valve head 134 upwardly into engagement with a valve seat and passage 122 along a path inclined from the vertical by about 20° or more to close the valve in the event of a vehicle rollover.

A combination vacuum/pressure relief valve designated generally 138 is also incorporated in tank valve 28. Details of valve 138 are best shown in FIG. 4.

Referring to FIG. 4, tank valve housing 80 is formed with a chamber 140 located above chamber 126. A passage 142 leads from chamber 140 into the main outlet passage 112 of tank valve 28, see FIG. 6, the course of this passage 142 lying generally beneath valve cover 144 as shown in the plan view of FIG. 5.

Referring back to FIG. 4, chamber 126 is in communication at all times with running vapor canister 38 via conduit 36, while chamber 140 is in communication at all times with refueling vapor canister 34 via passage 142, passage 112 (FIG. 6) and conduit 32. Communication between chambers 126 and 140 is normally blocked by a main valve head 146 which is biassed downwardly by a spring 148 to close and seal the open upper end of chamber 126. A second valve head 150 is normally biassed upwardly against the bottom of valve head 146 by a spring 152 to close a passage 154 which extends centrally upwardly through valve head 146.

The primary purpose of vacuum/pressure relief valve 138 is to provide such relief to the head space of tank 20 during normal operation of the vehicle in the event the vent 42 of running vapor canister 38 malfunctions, as by a blockage of the vent. As described above, the head space of fuel tank 20 is vented to atmosphere through the running vapor canister vent 42 to provide pressure compensation for the withdrawal of fuel from the tank by operation of the vehicle engine 54. At the same time, if ambient conditions result in an increase in pressure of the fuel vapor in the head space of tank 20 to a pressure above atmospheric, vapor is discharged from the head space of tank 20 into running vapor canister 38. If the vent to the running vapor canister becomes blocked, flow in either direction through conduit 36 will not occur except when purge valve 48 is open to allow vapor to be withdrawn from canister 38 into the intake manifold. Thus, blockage of vent 42 may result in either an undesirable increase or decrease of pressure in the head space of tank 20.

Should a vacuum begin to build up in the head space of tank 20, the reduction of pressure in chamber 126 will eventually overcome the biassing action of spring 152 and valve head 150 will move downwardly as viewed in FIG. 4 to unblock passage 154, thus placing chambers 140 and 126 in communication with each other to place the running vapor canister 38 in communication with refueling vapor canister 34. Refueling vapor canister 34 is provided with a vent 156 (FIG. 1) which may incorporate a one-way check valve oriented to block discharge of vapor from canister 34 into the atmosphere while accommodating flow of air into canister 34 if the pressure within the canister falls below atmospheric pressure. The head space of tank 20 may thus be vented via the refueling vapor canister.

Should blockage of vent 42 of running vapor canister 38 cause an undue increase in pressure in the head space of tank 20, the increase in pressure in the head space will act in chamber 126 to lift valve head 146 off its seat to place chambers 126 and 140 in communication with each other. Fuel vapor from the head space can then flow into refueling canister 34 to relieve this excess pressure. Canister 34 has sufficient capacity to accommodate vapor expelled from the tank under this latter condition.

The system of FIG. 1 includes two emergency devices operable in the event the fuel dispensing nozzle is not shut off when the tank is filled. Present day fuel nozzles are almost universally equipped with an automatic shutoff device which will shut off the nozzle in response to the backing up of fuel in the filler pipe. In the event the nozzle shutoff device should malfunction or for some other reason fuel continues to be pumped into the tank after the tank is filled the system will first produce an audible warning signal from a whistle device designated generally 160 incorporated in tank valve 28. If this signal is ignored, continued flow of fuel into the tank will open an emergency liquid relief valve designated generally 162 (FIG. 2) to allow liquid fuel in fill pipe 22 to bypass nozzle seal 62 and spill from the fill pipe.

Figure 7:
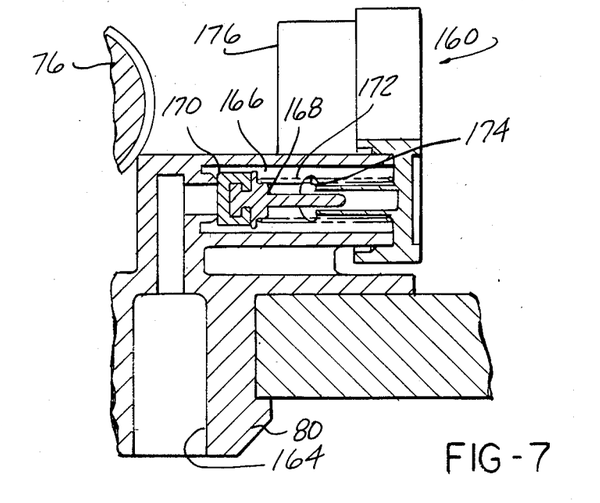
FIG. 7 is a cross-sectional view taken on line 7—7 of FIG. 5.

Whistle device 160 is actuated in response to an increase in pressure in the head space of fuel tank 20 above a preselected pressure. Referring to FIG. 7, housing 80 is formed with an inlet 164 opening directly into the head space of the fuel tank. Communication between inlet 164 and a chamber 166 in housing 80 is normally blocked by a valve head 168 held against a valve seat 170 by a compression spring 172. An outlet 174 of chamber 166 communicates with a whistle located within a housing 176, the whistle being vented to atmosphere. When the pressure in the head space of fuel tank 20 becomes sufficient to unseat valve head 168, fuel vapor from the head space in tank 20 flows through chamber 166 and outlet 174 to the atmosphere, producing an audible signal alerting the attendant to the fact that the nozzle should be shut off.

The emergency liquid relief valve 162 is best shown in FIG. 2. An opening 178 through the wall of fill neck 24 is normally closed by a valve head 180 biased to the closed position by a spring 182, the valve head and spring being located within a housing 184 at one side of fill neck 24. Housing 184 also encloses a second opening 186 through the wall of fill neck 24 located at the inlet side of annular seal 62. When the pressure of liquid against valve head 180 exceeds the biassing force of spring 182, valve head 180 will be forced clear of opening 178 to permit liquid to flow through opening 178, the interior of housing 184 and into the open inlet end of fill neck 24 to spill from the fill neck.

While operation of whistle device 160 will vent fuel vapor from tank 20 directly into the atmosphere and operation of the emergency liquid relief valve 162 will spill raw fuel from the vehicle, these devices are operable only in an emergency situation which might otherwise lead to rupture of fuel tank 20 or associated components from excessive internal pressure.

OPERATION OF THE SYSTEM OF FIG. 1

Operation of the system described thus far is as follows. After removal of the fill pipe cap 26, the fuel dispensing nozzle of a conventional service station pump is inserted into the fill pipe through annular seal 62. Seal 62 is so sized that it makes a sliding seal with the outer periphery of the inserted nozzle, these nozzles being made to a standard outer diameter. Insertion of the nozzle through seal 62 hinges trap door seal plate 64 to the broken line position indicated in FIG. 2, at which time the magnet 68 carried on the trap door causes the contacts of reed switch 70 to close to energize solenoid 76 of tank valve 28. Energization of solenoid 76 retracts valve head 116 (FIG. 6) clear of its valve seat 120 to place the main tank valve outlet 112 in communication with inlet passage 90. Because the tank is not full at this time, float valve member 94 will be disengaged from its seat 98 and upon energization of solenoid 76, the head space of fuel tank 20 will be placed in direct communication with the refueling vapor canister 34 via conduit 32.

Actuation of the fuel dispensing nozzle to dispense fuel into tank 20 will cause a consequent displacement of fuel vapor from the head space of tank 20 past the open float valve and open solenoid valve and thence through conduit 32 to the refueling vapor canister. Fuel vapor from the head space of tank 20 can also at this time flow to the running vapor canister 38 via the normally open passage 122 (FIG. 4), chamber 126, outlet passage 128 and conduit 36. However, this latter flow path from tank 20 to the running vapor canister 38 is relatively restricted as compared to the flow path from tank 20 to refueling vapor canister 34 and by far the major portion of fuel vapor displaced from tank 20 by the incoming fuel will flow into refueling vapor canister 34.

When tank 20 has been refilled, the level of fuel within the tank will rise to a point where float valve member 94 is buoyed upwardly to seat against valve seat 98, thus blocking inlet 90 and shutting off further flow of vapor from the tank to refueling vapor canister 34. Pressure in the head space of tank 20 will increase as fuel continues to flow into the tank, the relatively restricted flow path to running vapor canister 38 having an insufficient flow capacity to prevent such a pressure increase. The increased pressure in the head space will in turn eventually cause fuel to back up into fill pipe 22, and in normal circumstances the backup of fuel within fill pipe 22 will actuate an automatic nozzle shutoff device to terminate pumping of further fuel into the fill pipe.

Should the nozzle not shut off, further pressure buildup in the head space of tank 20 will actuate whistle device 160 to audibly alert the attendant. If the nozzle is not shut off in response to this signal, a further pressure increase will cause emergency relief valve 162 to open to bypass the nozzle seal and spill excess fuel from the open end of the filler pipe.

Upon the conclusion of the refueling operation, withdrawal of the nozzle from annular seal 62 permits trap door 64 to return to its normal closed position and the consequent movement of magnet 68 away from reed switch 70 allows the contacts of this switch to resume their normally opened position, thus de-energizing solenoid 76 and permitting valve head 116 to return to its seat 120 to block communication between tank valve inlet 90 and outlet 112, thereby isolating refueling canister 34 from the head space of tank 20, regardless of whether float valve 94 is open or closed.

During subsequent operation of the vehicle, the head space in tank 20 is vented via the vent 42 in running vapor canister 38 to provide pressure compensation for the consumption of fuel from tank 20 by the engine.

As described above, purge valve 48 is opened and closed under the control of computer 56 so that fuel vapor can be withdrawn at a controlled rate from running vapor canister 38 and refueling vapor canister 34 for combustion in engine 58.

Abnormal pressure or vacuum conditions in the head space of tank 20 are corrected by the vacuum/pressure relief valve as described above.

Figure 8:
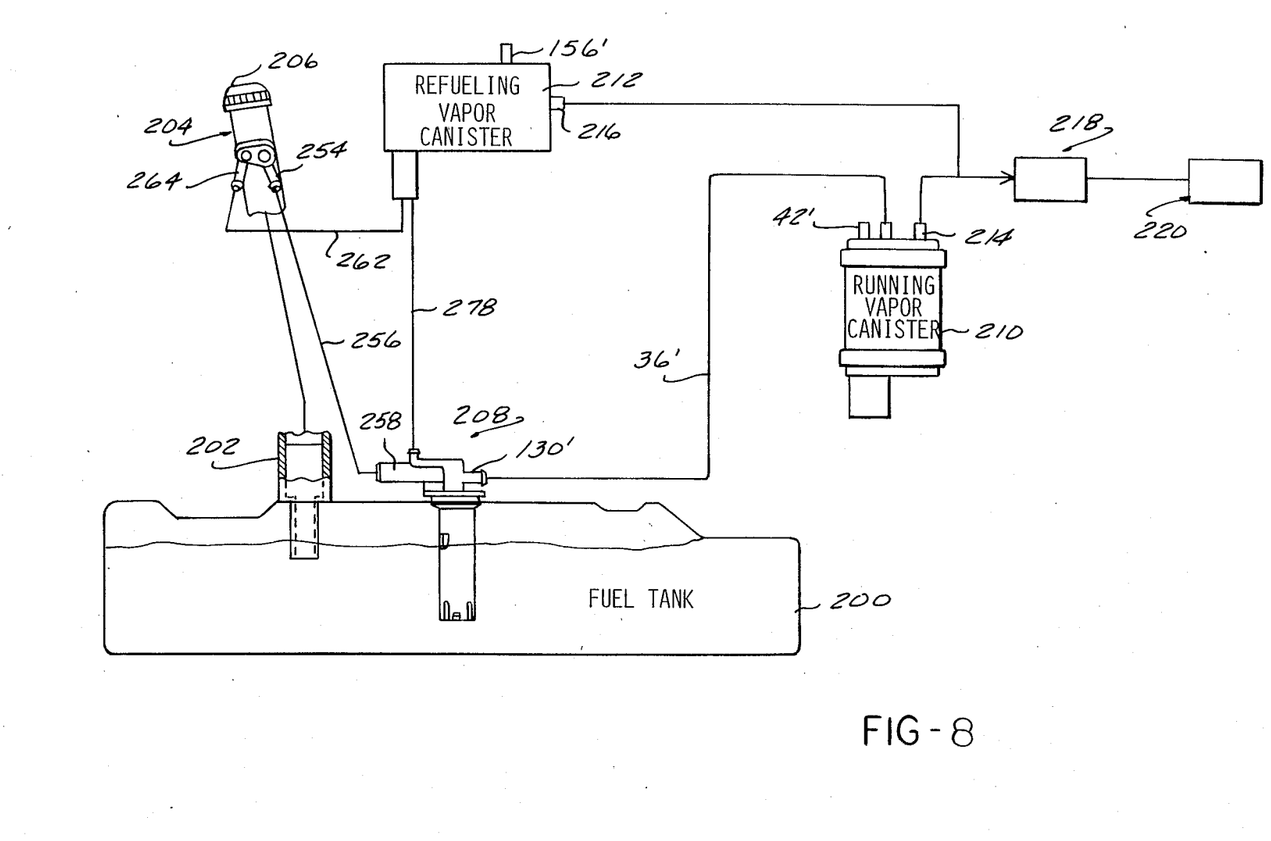
FIG. 8 is a schematic diagram of a second embodiment of a refueling vapor recovery system embodying the present invention.

EMBODIMENT OF FIG. 8

In FIG. 8, a modified form of refueling vapor recovery system is shown. The system of FIG. 8 differs from that of FIG. 1 primarily in the employment of a mechanically actuated valve, as opposed to the solenoid actuated valve of the FIG. 1 system, to establish communication between the head space of the fuel tank and the refueling vapor canister during the refueling operation. In many instances, various parts of the system of FIG. 8 are similar in construction and function to corresponding parts of the system of FIG. 1 described above.

In the system of FIG. 8, a vehicle fuel tank 200 is connected in a conventional manner to a fill pipe connected at its upper end to a fill neck assembly designated generally 204 which is normally closed by a conventional closure cap 206. A tank valve designated generally 208 is sealingly mounted in and projects through the upper wall of tank 200 to control, in a manner to be described in greater detail below, fluid communication between the head space of tank 200, a running vapor canister 210 and a refueling vapor canister 212. Outlets 214 and 216, respectively, of running vapor canister 210 and refueling vapor canister 212 are commonly connected to a computer controlled purge valve 218 whose outlet in turn is connected to the intake manifold of the vehicle engine designated generally 220. The computer controlled purge valve functions in the same manner as purge valve 48 of the FIG. 1 embodiment to enable the vehicle engine, when running, to withdraw fuel vapor at a controlled rate from canisters 210 and 212 for combustion in engine 220.

Figure 9:
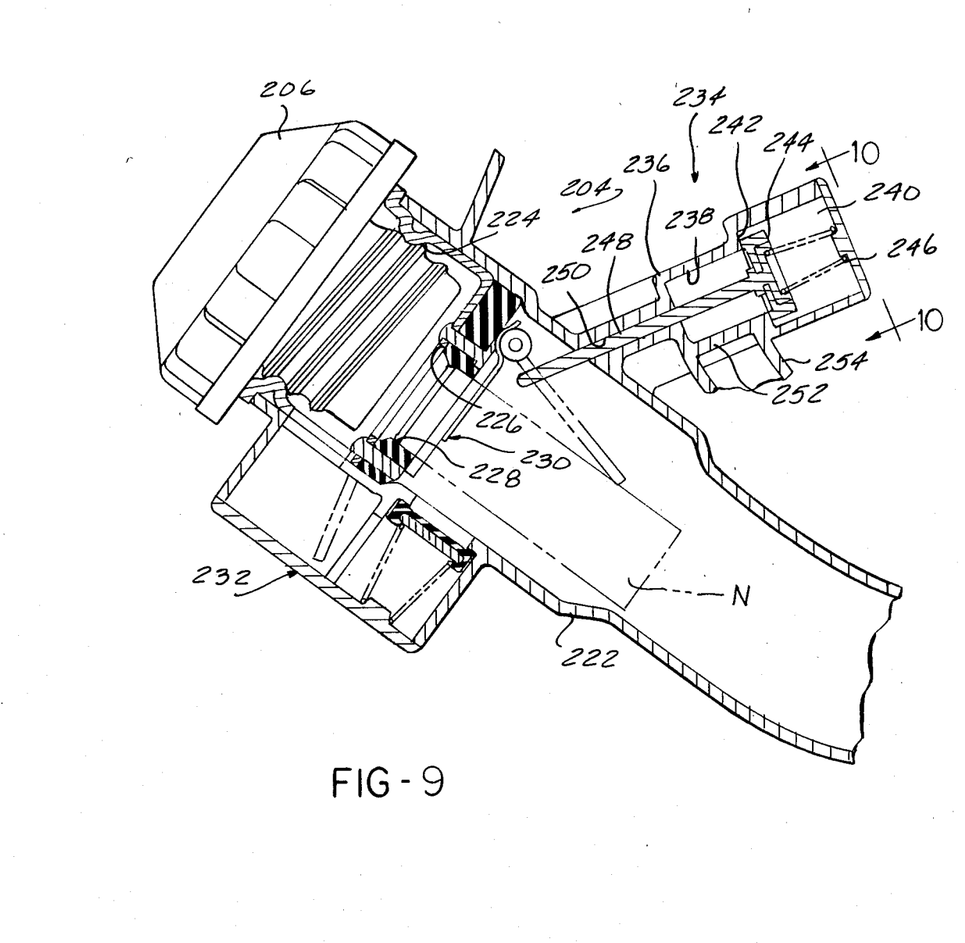
FIG. 9 is a detail cross-sectional view of the inlet end of the fuel tank filler pipe of the system of FIG. 8.

Referring now to FIG. 9, fill neck 204 includes a generally tubular housing 222 having a cup-shaped insert 224 seated in its upper end to provide an internal thread for cap 206. The bottom of insert 224 is formed with a circular opening 226 within which is mounted an annular nozzle seal 228 normally closed at its lower or inner end by a spring biassed trap door seal designated generally 230. The insert 224, seal 228 and trap door seal 230 are constructionally and functionally equivalent to the corresponding elements of fill neck 24 described above. An emergency liquid relief valve designated generally 232 of the same construction and function as the emergency relief valve 162 of fill neck 24 of the FIG. 1 embodiment is mounted on fill neck 204.

Suitable portions of fill neck assembly 24 which will be contacted by the fuel dispensing nozzle are provided with means, not shown, for electrically grounding the nozzle to the vehicle frame during the refueling operation.

In fill neck 204, opening of the hinged trap door valve 230 by the insertion of a fuel dispensing nozzle through annular seal 228 is employed to mechanically open a normally closed refuel vapor valve designated generally 234 mounted on the outer side of fill neck housing 222 in a valve housing 236 integrally formed on housing 222. As best shown in FIG. 9, valve housing 236 is formed with an inner chamber 238 which opens at its right-hand end as viewed in FIG. 9 into a chamber 240 of somewhat larger dimensions which defines an annular shoulder 242 around the open end of chamber 238. A valve head 244 is normally biassed against shoulder 242 by a spring 246 to block communication between chambers 238 and 240. An elongate valve stem 248 fixed to valve head 244 slidably projects through a bore 250 in housing 236 and into the interior of main housing 222. Upon hinging movement of the trap door valve 230 to its open position, indicated in broken line in FIG. 9, by the insertion of a fuel dispensing nozzle N through annular seal 228, valve stem 248 will be driven to the right as viewed in FIG. 9 by the trap door to lift valve head 244 clear of shoulder 242 to place chambers 238 and 240 in communication with each other.

An inlet 252 to chamber 238 communicates with a hose coupling 254 which is in turn (FIG. 8) connected by a hose or other suitable conduit schematically indicated at 256 to a hose coupling 258 on tank valve 208. Fuel vapor from the head space of tank 200 can, under conditions to be described below, flow from tank 200 through conduit 256 into chamber 238 and, when valve head 244 is unseated, pass through chamber 240 to an outlet 260 (FIG. 11) of chamber 240 and thence through a conduit 262 connected to a coupling 264 communicating with outlet 260 to refueling vapor canister 212. Vapor can flow from tank 200 to refueling canister 212 through the foregoing path only when refueling valve 234 is held open by the insertion of a refueling nozzle through annular seal 228.

Figures 10, 11, 12, 14, 15:
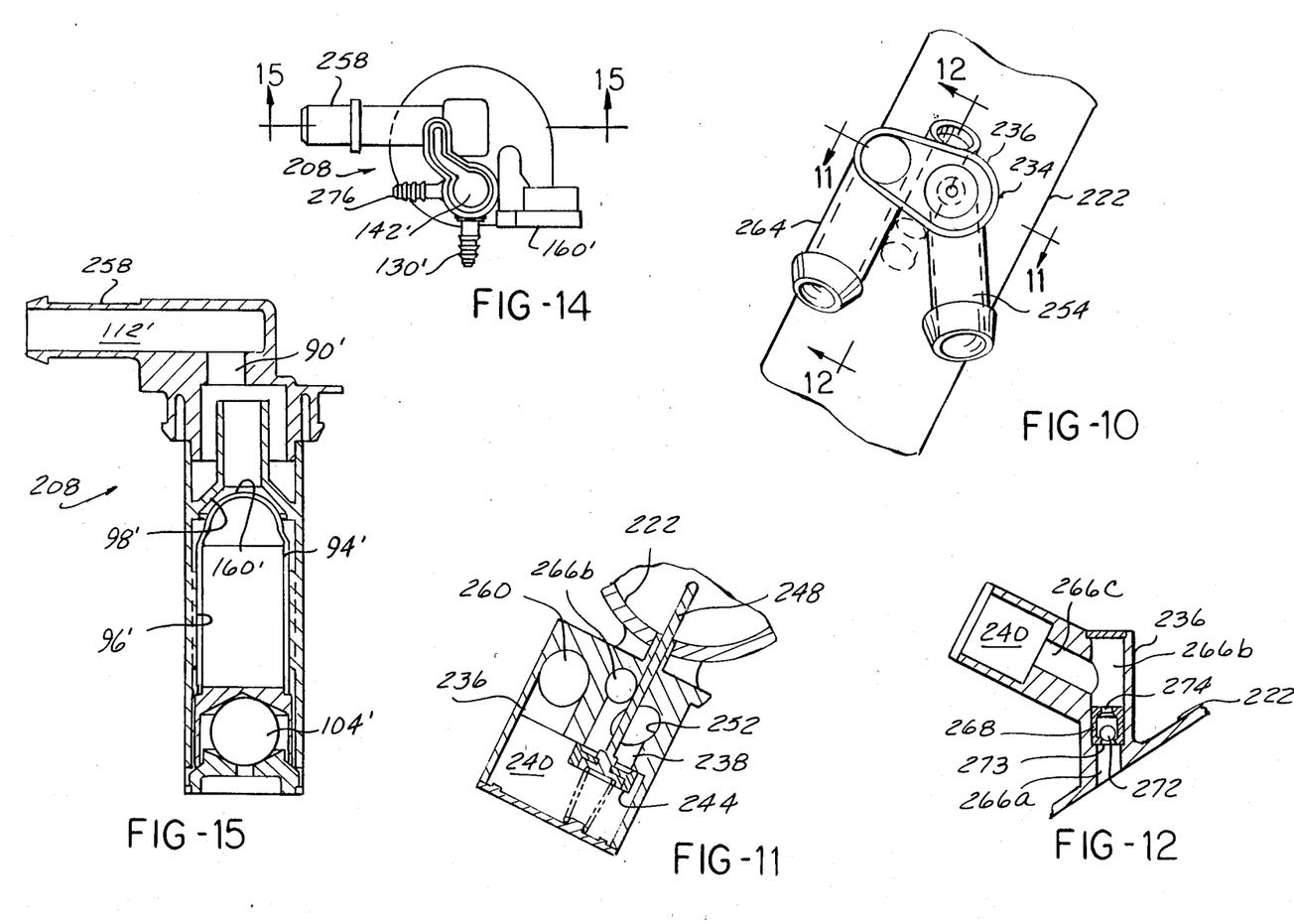
FIG. 10 is a side elevational view of a portion of the filler pipe of the system of FIG. 8 taken approximately from a plane 10—10 of FIG. 9.
FIG. 11 is a detail cross-sectional view taken on line 11—11 of FIG. 10.
FIG. 12 is a detail cross-sectional view taken on line 12—12 of FIG. 10.
FIG. 14 is a top plan view of the tank valve of the system of FIG. 8.
FIG. 15 is a cross-sectional view taken on line 15—15 of FIG. 14.
Figure 13:
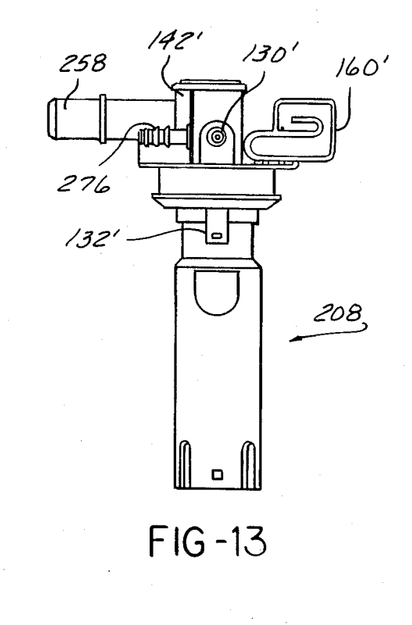
FIG. 13 is a side elevational view, partially in section, of a tank valve employed in the system of FIG. 8.

A fuel vapor vent for venting fuel vapor from that portion of fill neck 204 at the tank side of seal 228 is also provided in housing 236. The vapor vent valve is best shown in FIG. 12 and includes a passage having successive sections 266a, 266b, 266c, which extend from the interior of housing 222 through housing 236 into chamber 240. Fluid communication between sections 266a and 266b of this passage is controlled by a cage 268 which retains a relatively lightweight ball 272 which can seat in either of two openings 273, 274 at opposite ends of the cage to block communication between passage sections 266a and 266b when so seated. The weight of the ball is such that it may be easily lifted from the lower seat 273 if the vapor pressure within fill neck housing 222 exceeds the pressure in chamber 240 to vent vapor from the fill neck into chamber 266b and thence to the refueling vapor canister.

In the event liquid fuel should flow upwardly through passage section 266a, ball 272 will float upon the rising liquid and close the upper opening 274 in cage 268 to prevent liquid fuel from reaching chamber 240.

Tank valve 208 of the system in FIG. 8 includes many of the same components utilized in tank valve 28 of the system of FIG. 1. Components of tank valve 208 which are common with components of tank valve 28 are identified by primed reference numerals corresponding to the reference numerals employed for tank valve 28.

Referring first to FIG. 15, tank valve 208 includes a float-rollover valve assembly of the same construction as that employed in tank valve 28, including a float-rollover valve member 94' guided for movement within the float-rollover housing 84' as by ribs, 96'. A downwardly facing frusto-conical valve seat within housing 84' is located to be engaged and sealed by the hemispherical valve head portion 100' of the float-rollover member 94' when this member is elevated either by a rise of fuel level within tank 200 or cammed upwardly by ball 104' in the event of a vehicle rollover.

In the FIG. 1 embodiment, tank valve 28 included a solenoid actuated valve controlling communication between its inlet 90 and outlet passage 112. In the embodiment of FIG. 8, the function of the solenoid valve of the FIG. 1 embodiment is performed by the refuel valve 234 located at the vehicle fill neck. Thus, in tank valve 208, the inlet 90' is in direct communication at all times with the outlet passage 212'.

A combination vacuum/pressure relief valve 142' incorporating a rollover valve 132' in its inlet from the tank are also employed in tank valve 208. The valves 142' and 132' of tank valve 208 are identical in structure to the respective valves 142 and 132 of the FIG. 1 embodiment.

In tank valve 208, vacuum/pressure relief valve 142' communicates with the running vapor canister 210 via a hose coupling 130' and conduit 36'. Communication between valve 142' and the refueling vapor canister 212 of the FIG. 8 embodiment is via a hose coupling 276 and conduit 278.

As in the FIG. 1 embodiment, refueling vapor canister 210 of the FIG. 8 embodiment is provided with a vent 42' and refueling vapor canister 212 may also be provided with a vent 156.

OPERATION OF THE FIG. 8 SYSTEM

Operation of the system of FIG. 8 is essentially the same as that of the system of FIG. 1 described in detail above.

The main differences between the two systems lies in the physical location of the valve which places the refueling vapor canister in communication with the head space of the fuel tank only during a refueling operation. In the system of FIG. 1 this valve is constituted by the solenoid valve on tank valve 28 which includes valve head 116 and seat 120. In the system of FIG. 8, the refuel valve 234 is located on the fill neck. Space limitations in the particular vehicle in which the system is employed may make one of these systems preferable to the other.

As disclosed, the system of FIG. 8 provides a fill neck vent valve operable to vent fuel vapor from the fill neck to the refueling vapor canister at all times during the refueling event when the vapor pressure in the fill neck is sufficient to lift ball 272 (FIG. 12) off its seat. Such a valve might be incorporated in the system of FIG. 1 if desired.

While two embodiments of an onboard refueling vapor recovery system have been disclosed, it will be apparent to those skilled in the art the disclosed embodiments may be modified. Therefore, the foregoing description is to be considered exemplary rather than limiting, and the true scope of the invention is that defined in the following claims.

We claim:

1. An improvement in a vehicle having an internal combustion engine, a fuel supply system including a refillable fuel storage tank for supplying volatile fuel to said engine, the fuel tank including a filler pipe having an inlet end adapted to sealingly receive an elongate tubular fuel dispensing nozzle of a standard diameter to accommodate refueling of said vehicle from an external source of volatile fuel and a running vapor recovery system including a canister for storage of fuel vapors generated during operation of the engine;

said improvement comprising an onboard additional refueling vapor recovery system mounted in said vehicle for storing and disposing of the relatively larger quantity of fuel vapor displaced from the fuel tank by the refilling of the tank with volatile fuel, said refueling vapor recovery system being connected in parallel with the running vapor recovery system and comprising a refueling vapor storage canister mounted in said vehicle, first conduit means for conducting fuel vapor displaced from said tank during the refueling of the tank with volatile fuel from the tank into said refueling vapor storage canister, first valve means operable in a normally closed position to prevent the flow of vapor from the tank to said refueling vapor canister via the first conduit means and operable in an actuated open position to permit the flow of fuel vapor from the tank through said first conduit means into said refueling vapor canister, actuating means responsive to the insertion of the nozzle through sealing means for actuating said first valve means to its open position, and onboard computer controlled means responsive to the operation of the engine for conducting fuel vapor at a controlled rate from said refueling vapor canister to the engine for combustion in the engine.

2. In a vehicle having an internal combustion engine, and a fuel supply system including a refillable fuel storage tank for supplying volatile fuel to said engine, said fuel tank including a filler pipe having an inlet end adapted to receive an elongate tubular fuel dispensing nozzle of a standard diameter to accommodate refueling of said vehicle from an external source of volatile fuel; the improvement comprising an onboard refueling vapor recovery system mounted in said vehicle for storing and disposing of fuel vapor displaced from said fuel tank by the refueling of said tank with volatile fuel, said recovery system comprising nozzle receiving seal means located adjacent said inlet end of said filler pipe normally sealing said inlet end against the discharge of fuel vapor into the atmosphere from said fuel tank through said filler pipe and operable to accommodate the insertion of a tubular fuel dispensing nozzle of standard diameter into said filler pipe through said sealing means to refill said tank with fuel while maintaining said inlet end sealed against the discharge of fuel vapor into the atmosphere, a refueling vapor storage canister mounted in said vehicle, first conduit means for conducting fuel vapor displaced from said tank during the refueling of said tank with volatile fuel from said tank into said storage canister, first valve means operable in a normally closed position to prevent the flow of vapor from said tank to said canister via said first conduit means and operable in an actuated open position to permit the flow of fuel vapor from said tank through said first conduit means into said canister, actuating means responsive to the insertion of said nozzle through said sealing means for actuating said first valve means to its open position, means responsive to the operation of said engine for conducting fuel vapor at a controlled rate from said canister to said engine for combustion in said engine, said seal means comprising a wall extending across the interior of said filler pipe to divide said filler pipe into a first section open to the inlet end of said pipe and a second section opening into said fuel tank, means defining a passage through said wall, having an annular seal adapted to slidably and sealingly engage a tubular nozzle of standard diameter projected axially through said passage to establish a vapor tight seal between the exterior of the nozzle and said wall, and said actuating means comprises a trap door like valve plate mounted in said second section of said pipe for hinging movement between a normally maintained closed position adjacent said wall sealing said passage from said second section and an open position wherein said plate is hinged clear of said passage by the insertion of said nozzle through said passage, means defining a bypass passage having an inlet opening into said second section of said pipe and an outlet opening into said first section of said pipe, first normally closed one way valve means in said passage accommodating flow in a direction from said inlet to said outlet and resilient means for maintaining said one way valve means closed until the pressure in said second section rises to a predetermined emergency pressure.

3. In a vehicle having an internal combustion engine, and a fuel supply system including a refillable fuel storage tank for supplying volatile fuel to said engine;
the improvement comprising an onboard refueling vapor recovery system for storing and disposing of fuel vapor displaced from said fuel tank by the refueling of said tank with volatile fuel, said recovery system comprising a tank valve housing mounted upon the top of said fuel tank having a first inlet passage opening into the interior of said tank and first outlet at the exterior of said tank, a refueling vapor storage canister mounted in said vehicle, first conduit means defining a first fuel vapor flow passage extending from said tank valve outlet into said refueling canister, first valve means operable in a normally maintained closed position to block the flow of vapor from said tank through said first flow passage and operable in an actuated open position to accommodate flow of vapor from said tank through said first passage into said canister, actuating means responsive to the initiation of a tank refueling operation for actuating said first valve means to said open position and maintaining said first valve means in said open position until the refueling operation is terminated, normally open float valve means in said tank operable to block the flow of vapor from said tank into said flow passage when the level of fuel within said tank rises to or above a predetermined level, means in said tank valve housing defining a second vapor flow passage extending through said housing from a second inlet opening into said tank to a second outlet at the exterior of said tank, a running vapor canister mounted in said vehicle, second conduit means defining a second fuel vapor flow passage extending from said second outlet to said running vapor canister, and engine operation responsive means for transferring fuel vapor from said refueling and said running vapor canisters to said engine for combustion in said engine.

4. In a vehicle having an internal combustion engine, a fuel supply system including a fuel tank for supplying volatile fuel to said engine and a fuel tank fill pipe having a pipe inlet for receiving a tubular fuel dispensing nozzle of standard diameter to accommodate refueling of said tank, a running vapor canister vented to atmosphere mounted on said vehicle, first conduit means establishing a direct vapor flow passage between the head space of said fuel tank and said running vapor canister, and purge means having an inlet connected to an outlet of said running vapor canister for withdrawing fuel vapor from said running vapor canister for combustion in said engine; the improvement comprising a refueling vapor recovery system connected between the head space of said tank and the inlet of said purge means in parallel with said running vapor canister, said refueling vapor recovery system being operable to prevent fuel vapor displaced from said tank during a refueling operation from being vented into the atmosphere and comprising a refueling vapor canister mounted on said vehicle, first conduit means establishing a main valve controlled vapor flow passage between the head space of said tank and said refueling vapor canister, first normally closed valve means in said first conduit means operable when closed to block the flow of vapor through said main flow passage and operable in an actuated open position to accommodate the flow of vapor through said main flow passage, actuating means responsive to the presence of said nozzle in said inlet for actuating said first valve means to its open position, said main flow passage accommodating a substantially greater flow of vapor than said direct vapor flow passage, float valve means responsive to the level of fuel in said tank for blocking the flow of vapor from said tank into said main flow passage when the level of fuel within said tank is at or above a predetermined level, vacuum/pressure relief valve means responsive to the pressure differential between said refueling vapor canister and the head space of said fuel tank for accommodating the flow of vapor between said refueling canister and said head space maintain the pressure in said head space between predetermined upper and lower end limits when said first valve means is in its closed position.

5. In a vehicle having an internal combustion engine, a fuel supply system including a fuel tank for supplying volatile fuel to said engine and a fuel tank fill pipe having a pipe inlet for receiving a tubular fuel dispensing nozzle of standard diameter to accommodate refueling of said tank, a running vapor canister vented to atmosphere mounted on said vehicle, first conduit means establishing a direct vapor flow passage between the head space of said fuel tank and said running vapor canister, and purge means having an inlet connected to an outlet of said running vapor canister for withdrawing fuel vapor from said running vapor canister for combustion in said engine; the improvement comprising a refueling vapor recovery system connected between the head space of said tank and the inlet of said purge means in parallel with said running vapor canister, said refueling vapor recovery system being operable to prevent fuel vapor displaced from said tank during a refueling operation from being vented into the atmosphere and comprising a refueling vapor canister mounted on said vehicle, first conduit means establishing a main valve controlled vapor flow passage between the head space of said tank and said refueling vapor canister, first normally closed valve means in said first conduit means operable when closed to block the flow of vapor through said main flow passage and operable in an actuated open position to accommodate the flow of vapor through said main flow passage, actuating means responsive to the presence of said nozzle in said inlet for actuating said first valve means to its open position, said main flow passage accommodating a substantially greater flow of vapor than said direct vapor flow passage, float valve means responsive to the level of fuel in said tank for blocking the flow of vapor from said tank into said main flow passage when the level of fuel within said tank is at or above a predetermined level, nozzle receiving trap door seal means in said pipe inlet normally sealing the head space of said tank from said pipe inlet and operable to accommodate the insertion of said nozzle into said pipe inlet while maintaining said pipe inlet sealed against the discharge of vapor from said tank, vacuum/pressure relief valve means responsive to the pressure differential between said refueling vapor canister and the head space of said fuel tank for accommodating the flow of vapor between said refueling canister and said head space maintain the pressure in said head space between predetermined upper and lower end limits when said first valve means is in its closed position.

6. An improvement in a vehicle having an internal combustion engine, a fuel supply system including a refillable fuel storage tank for supplying volatile fuel to said engine and a running vapor recovery system including a canister for storage of running vapor only;
said improvement comprising a separate onboard refueling vapor recovery system for storing and disposing of fuel vapor displaced from the fuel tank by the refueling of the tank with volatile fuel, said refueling vapor recovery system comprising a tank valve housing mounted upon the top of the fuel tank and having a first inlet passage opening into the interior of the tank and first outlet at the exterior of the tank, a separate refueling vapor only storage canister mounted in the vehicle, first conduit means defining a first fuel vapor flow passage extending from the tank valve outlet into said refueling canister, first valve means operable in a normally maintained closed position to block the flow of refueling vapor from the tank through said first flow passage and operable in an actuated open position to accommodate flow of refueling vapor from the tank through said first passage into said canister, actuating means responsive to the initiation of a tank refueling operation for actuating said first valve means to said open position and maintaining said first valve means in said open position until the refueling operation is terminated, and normally open float valve means in said tank operable to block the flow of vapor from the tank into said flow passage when the level of fuel within said tank rises to or above a predetermined level.

7. An improvement in a vehicle having an internal combustion engine, a fuel supply system including a fuel tank for supplying volatile fuel to said engine and a fuel tank fill pipe having an inlet for receiving a tubular fuel dispensing nozzle of standard diameter to accommodate refueling of said tank, a first running vapor canister vented to atmosphere mounted on said vehicle, first conduit means establishing a direct running vapor flow passage between the head space of the fuel tank and the running vapor canister, and purge means having an inlet connected to an outlet of the running vapor canister for withdrawing fuel vapor from the running vapor canister for combustion in the engine; said improvement comprising a refueling vapor recovery system connected between the head space of the tank and the inlet of the purge means, in parallel with said running vapor canister, said refueling vapor recovery system being operable to prevent fuel vapor displaced from the tank during a refueling operation from being vented into the atmosphere and comprising a second refueling-vapor-only canister mounted on the vehicle, second conduit means providing a main vapor flow passage between the head space of the tank and said refueling vapor canister, normally closed valve means in said second conduit means operable when closed to block the flow of refueling vapor through said main vapor flow passage and operable in an actuated open position to accommodate the flow of refueling vapor through said main vapor flow passage, actuating means responsive to the presence of the nozzle in the fill pipe inlet for actuating said valve means to its open position, said main vapor flow passage accommodating a substantially greater flow of vapor than said direct running vapor flow passage.

8. A method for preventing fuel vapor displaced from the fuel tank inlet of an internal combustion engine powered vehicle during refueling of said tank from being discharged into the atmosphere comprising the steps of
1. sealing the inlet through which fuel is introduced into said tank from an external fuel supply source, the external fuel supply source including a tubular fuel dispensing nozzle of standard outer diameter insertable into the fuel tank inlet to dispense fuel into said tank against the discharge of fuel vapor while said tank is being refueled,
2. venting fuel vapor displaced from said tank during the refueling operation into a refueling-vapor-only canister mounted in the vehicle,
3. terminating the venting of refueling fuel vapor from said tank into said refueling-vapor-only canister upon the completion of said refueling operation,
4. intermittantly conducting fuel vapor from said refueling-vapor-only canister to said engine for combustion by said engine.

9. The invention defined in claim 8 wherein said method comprises the further steps of
5. establishing fluid communication between said tank and said refueling-vapor-only canister in response to the insertion of said nozzle into said inlet, and
6. terminating the venting of refueling fuel vapor from said tank by blocking communication between said tank and said refueling-vapor-only canister upon the occurrence of either of the following events:
    a. withdrawal of said nozzle from said inlet, or
    b. the filling of said tank to a predetermined level.

10. The invention defined in claim 1 wherein said seal means comprises a wall extending across the interior of said filler pipe to divide said filler pipe into a first section open to the inlet end of said pipe and a second section opening into said fuel tank, means defining a passage through said wall, having an annular seal adapted to slidably and sealingly engage a tubular nozzle of standard diameter projected axially through said passage to establish a vapor tight seal between the exterior of the nozzle and said wall, and said actuating means comprises a trap door like valve plate mounted in said second section of said pipe for hinging movement between a normally maintained closed position adjacent said wall sealing said passage from said second section and an open position wherein said plate is hinged clear of said passage by the insertion of said nozzle through said passage.

11. The invention defined in claim 10 further comprising means defining a bypass passage having an inlet opening into said second section of said pipe and an outlet opening into said first section of said pipe, first normally closed one way valve means in said passage accommodating flow in a direction from said inlet to said outlet, and resilient means for maintaining said one way valve means closed until the pressure in said second section rises to a predetermined emergency pressure.

12. The invention of claim 2 further comprising signal means operable to produce an audible signal in response to an increase in pressure in said tank to a pressure less than said emergency pressure.

13. The invention defined in claim 10 wherein said first valve means comprises a valve housing mounted on said filler pipe adjacent said inlet end, means defining a vapor flow passage extending through said housing from an inlet to an outlet and constituting a portion of said first conduit means, a first valve member mounted within said housing for movement between a first position closing said flow passage against the flow of vapor therethrough and a second position opening said flow passage to the flow of vapor therethrough from said inlet to said outlet, means biassing said first valve head to said first position, and means engageable between said first valve member and said plate for moving said first valve member from said first position to said second position in response to movement of said plate from its closed position to its open position.

14. The invention defined in claim 13 further comprising means for venting fuel vapor from said second section of said filler pipe into said inlet of said vapor flow passage of said first valve means.

15. The invention defined in claim 10 wherein said first valve means includes a solenoid operable when energized to locate said first valve means in said open position, normally open switch means operatively connected to said solenoid to normally maintain said solenoid deenergized and operable in an actuated switch closed position to energize said solenoid, said actuating means comprising means on said plate operable when said plate is in its open position to actuate said switch means to its switch closed condition.

16. The invention defined in claim 6 wherein said float valve means comprises a hollow tubular extension fixed to and projecting vertically downwardly from said tank valve housing into said tank and defining at least the lower portion of said inlet passage, said inlet passage having an enlarged diameter lower portion and a reduced diameter upper portion, a float slidably mounted in said enlarged diameter lower portion and having a head portion at its upper end seatable in the lower end of said upper portion of said inlet passage to seal said upper portion from said lower portion when said float is elevated by the rise of the level of fuel in said tank to said predetermined level.

17. The invention defined in claim 16 further comprising rollover means in said tubular extension engageable with said float for seating said head in the lower end of said upper section in response to the tilting of said extension from the vertical by more than a predetermined amount.

18. The invention defined in claim 6 wherein said inlet passage is in direct fluid communication with said outlet at all times.

19. The invention defined in claim 6 wherein said first valve means is located within said tank valve housing to control fluid communication between said inlet passage and said outlet.

20. The invention defined in claim 6 further comprising engine operation responsive means for transferring fuel vapor from said refueling canister to said engine for combustion in said engine.

21. The invention defined in claim 6 further comprising means in said tank valve housing defining a second vapor flow passage extending through said housing from a second inlet opening into said tank to a second outlet at the exterior of said tank, a running vapor canister mounted in said vehicle, second conduit means defining a second fuel vapor flow passage extending from said second outlet to said running vapor canister, and engine operation responsive means for transferring fuel vapor from said refueling and said running vapor canisters to said engine for combustion in said engine.

22. The invention defined in claim 3 further comprising third pressure responsive valve controlled passage means for transferring fuel vapor between said refuel and said running fuel vapor canisters in response to a predetermined pressure differential between said canisters.

23. The invention defined in claim 22 wherein said third valve controlled passage means includes first one way valve means oriented to accommodate flow from said refuel canister to said running canister when the pressure in said refuel canister exceeds the pressure in said running canister by a first predetermined amount, and second one way valve means oriented to accommodate flow from said running canister to said refuel canister when the pressure in said running canister exceeds the pressure in said refuel canister by a predetermined second amount.

24. The invention defined in claim 3 further comprising rollover responsive means operable in response to a vehicle rollover condition for blocking fluid communication between said tank and said first and said second vapor flow passages.

25. The invention defined in claim 7 further comprising nozzle receiving trap door seal means in said pipe inlet normally sealing the head space of said tank from said pipe inlet and operable to accommodate the insertion of said nozzle into said pipe inlet while maintaining said pipe inlet sealed against the discharge of vapor from said tank.

26. The invention defined in claim 7 or claim 25 further comprising vacuum/pressure relief valve means responsive to the pressure differential between said refueling vapor canister and the head space of said fuel tank for accommodating the flow of vapor between said refueling canister and said head space maintain the pressure in said head space between predetermined upper and lower end limits when said first valve means is in its closed position.

27. The improvement of claim 7, having float valve means responsive to the level in the tank for blocking the flow of refueling vapor from the tank into said main vapor flow passage when the level of fuel within the tank is at or above a predetermined level.

* * * * *